Aug. 16, 1960   A. J. LAUBE ET AL   2,948,921
APPARATUS FOR POST-CURING INFLATION OF PNEUMATIC TIRES
Filed Dec. 23, 1958   3 Sheets-Sheet 1

INVENTOR.
Alfred J. Laube
Richard L. Southard
BY Tomy W. Cornwell

Owen + Owen
ATTORNEYS

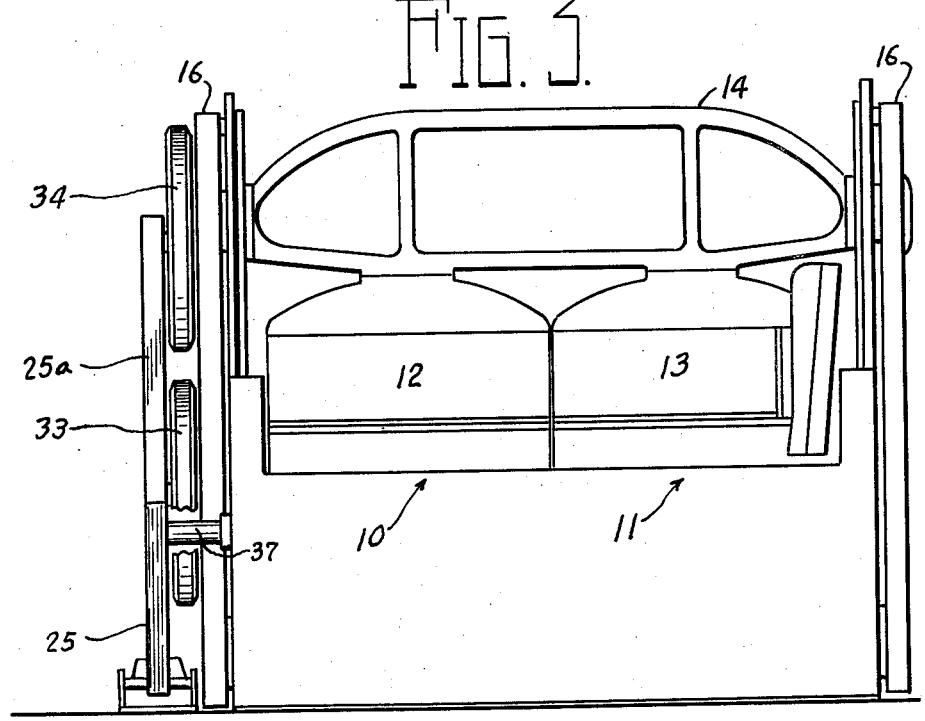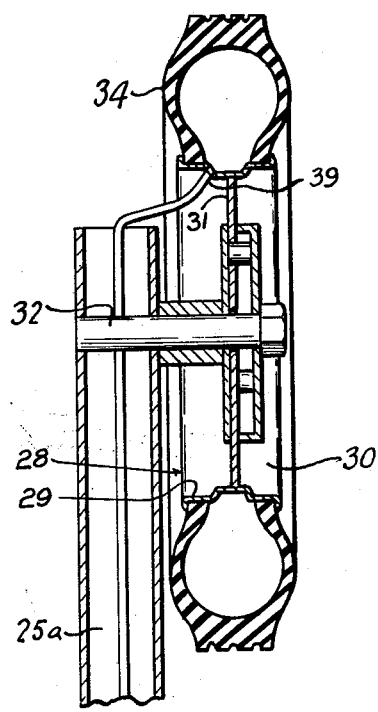

INVENTOR.
Alfred J. Laube
Richard L. Southard
BY Tomy W. Cornwall

Owen + Owen
ATTORNEYS

United States Patent Office 2,948,921
Patented Aug. 16, 1960

2,948,921

APPARATUS FOR POST-CURING INFLATION OF PNEUMATIC TIRES

Alfred J. Laube, Richard L. Southard, and Tomy W. Cornwell, Findlay, Ohio, assignors to Cooper Tire & Rubber Company, Findlay, Ohio, a corporation of Delaware Filed Dec. 23, 1958, Ser. No. 782,437

3 Claims. (Cl. 18—4)

This invention relates to the post-curing inflation of pneumatic tires, and particularly to an apparatus suitable for attachment to a conventional pneumatic tire molding machine for the post-curing inflation of the tires molded on the machine.

The recent development of nylon cord tires has introduced a considerable problem to the industry because the nylon cord in the tire will stretch after the tire is cured and if the tire is placed upon a vehicle at the size at which it is cured, the growth of the tire during normal service on the vehicle will have the disadvantageous result of causing a multiplicity of cracks in the tread grooves. In order to overcome this disadvantage inherent in nylon cord tires, a process of post-curing inflation has been developed. This process consists of inflating each tire after it is cured in the molding machine and before it is cooled to room temperature to an extent greater than that to which it will be inflated in its normal road usage. This post-curing inflation stretches the nylon cord to its ultimate extent. The tire is allowed to cool to room temperature while it is stretched to this extent and, therefore, it cools at the larger stretched size. After post-curing inflation nylon cord tires do not grow further in service and are not subject to the objectionable tread-groove cracking that occurs in nylon cord tires which have not been given this extra treatment.

It is the object of this invention to provide an apparatus designed for effecting post-curing inflation pneumatic tires and which is designed so that it may be attached to a conventional tire molding machine and will not obstruct access to the machine or interfere with the normal passage past the machine in the factory during tire molding and inflation cycles and yet will be in position readily available for the machine operator to remove finished tires and to place just molded tires on the apparatus during the time when the molding machine is open.

This objective of availability during the time when the molding machine is open and retraction to a position adjacent the molding machine where the apparatus of the invention does not obstruct traffic or interfere with access to the machine is important, because in a tire manufacturing plant the molding presses are usually placed closely adjacent each other and one operator may service a considerable number of these presses. Because post-curing inflation must be done immediately after molding and before the tire cools, the apparatus should be near the molding machine. If the post-curing inflation apparatuses were positioned in the aisles adjacent the molding machines, they would interfere with access to the machines and probably also with conveying systems employed for carrying raw carcasses to the molding machines and molded tires away from the molding machines.

The principal object and other objects and advantages of this invention will be better understood by reference to the specification which follows, and to the drawings, in which—

Fig. 3 is a somewhat simplified view in front elevation of the molding machine illustrated in Figs. 1 and 2 and equipped with a post-curing inflation apparatus embodying the invention;

Fig. 4 is a fragmentary vertical sectional view on an enlarged scale taken from the position indicated by the line 4—4 in Fig. 1 and showing a tire in position on apparatus embodying the invention;

Figure 1:
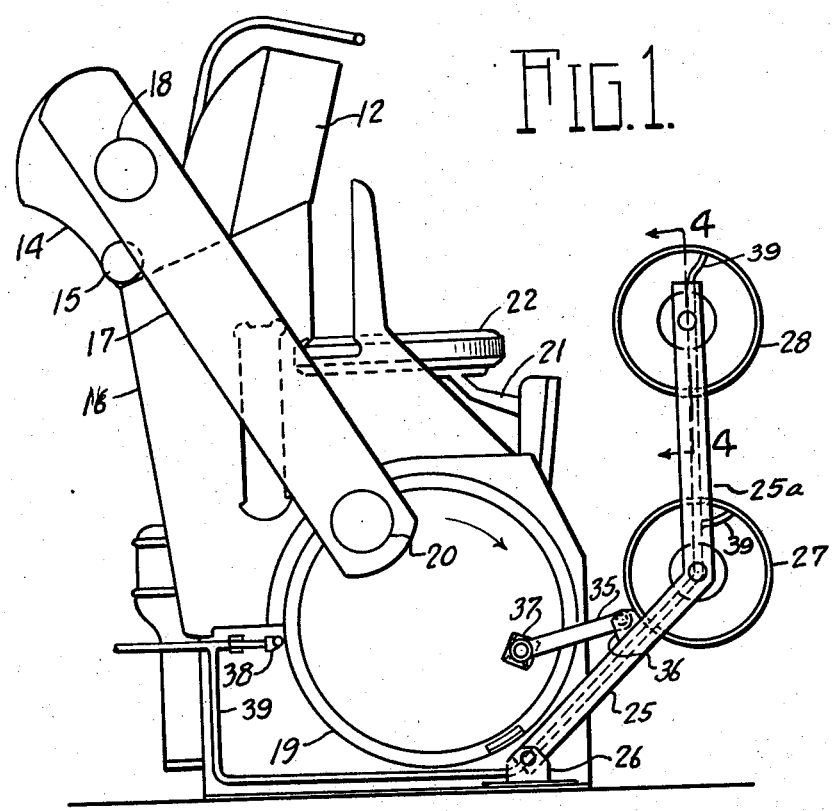
Fig. 1 is a view in side elevation of a conventional twin-mold molding machine equipped with one form of apparatus embodying the invention, showing the tire molding machine in "mold-open" position.
Figure 2:
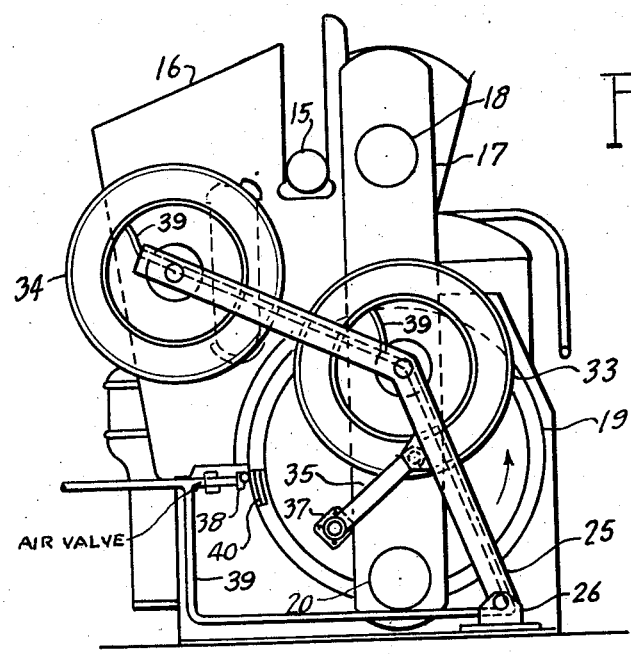
Fig. 2 is a view similar to Fig. 1, but showing the tire molding machine in "mold-closed" position.
Figure 5:
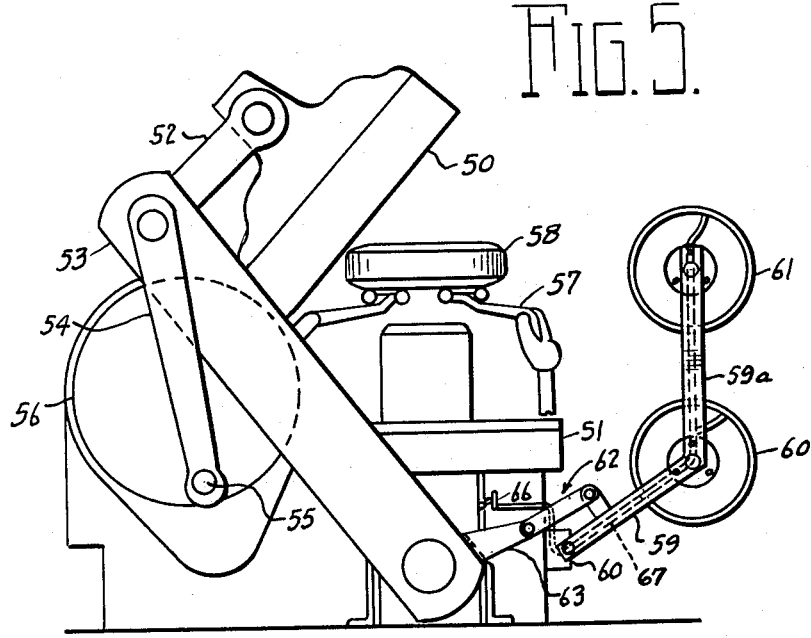
Figure 6:
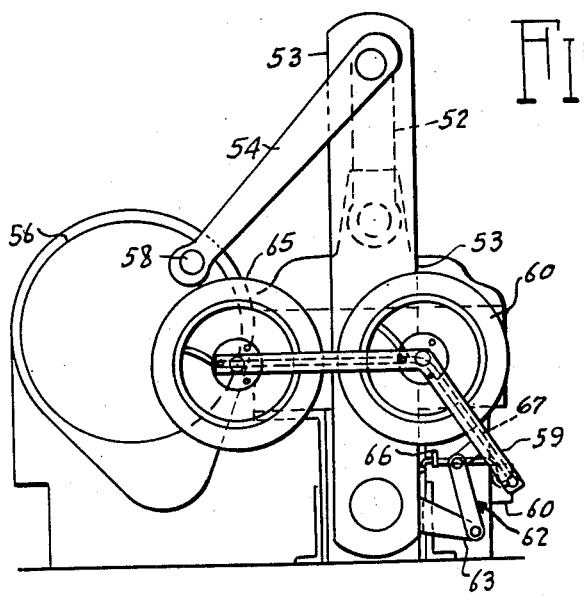

Fig. 5 is a view similar to Fig. 1, but illustrating an apparatus embodying a modified form of the invention attached to a different standard type of tire molding machine, the molding machine being shown in "mold-open" position, and Fig. 6 is a view similar to Fig. 2, but of the tire molding machine and apparatus embodying the invention which are shown in Fig. 5, the tire molding machine being shown in "mold-closed" position.

There are several types of tire molding machines, two of the most common being illustrated in simplified form in Figures 1, 2, 3 and 5, 6, respectively. Both of these types of tire molding machines have many parts of similar nature and function although they are arranged in slightly different relationship to each other. For purposes of simplification in the description of these machines, each will be considered as having a "mold top mechanism" which includes all of the parts necessary for opening and closing the upper half of the pneumatic tire molds and for holding the molds tightly compressed during the molding and curing cycle of the molding machine. These mold top mechanisms comprise, among other parts, heavy bull gears and walking arms which are swung through controlled pathways by the reciprocal oscillation of the bull gears.

In the molding machine generally illustrated in Figs. 1–3, there are two pneumatic tire molds generally indicated at 10 and 11, each of which comprises a mold top 12 or 13, respectively, the two mold tops 12 and 13 being mounted upon a bridge 14. The bridge 14 is guided by rollers 15 which ride on the contoured surface of heavy steel guides 16, one at each side of the machine. The mold tops 12 and 13 are moved between the open position shown in Fig. 1 and the closed position shown in Figs. 2 and 3 by the action of a pair of heavy walking arms 17 pivotally connected to the ends of the beam 14 by trunnions 18 and attached to a reciprocal bull gear 19 by a crank 20. The bull gear 19 oscillates between the positions shown in Figs. 1 and 2, moving in a clockwise direction from the "mold-open" position of Fig. 1 to the "mold-closed" position of Fig. 2 and in a counterclockwise direction from the position of Fig. 2 to the position of Fig. 1. The molding machine is also equipped with miscellaneous other parts including tire lifters, generally indicated at 21, which act to lift a molded tire 22 out of the bottom half of the tire molds 10 or 11 at the conclusion of a molding cycle.

Apparatus embodying the instant invention is mounted adjacent the molding machine and comprises a main lever 25 which is pivoted at its lower end in a yoke 26 rigidly connected to the floor or the main frame of the molding machine. The lever 25 oscillates back and forth in a vertical plane moving to and from the positions shown in Figs. 1 and 2 as the molding machine opens and closes. In the embodiment of the invention illustrated in Figs. 1–3, two tire rims 27 and 28 are mounted near the free end of the lever 25. If the mold machine had only one tire mold, then apparatus embodying the invention would need only one tire rim.

Each of the rims 27 and 28 (Fig. 4) comprises a pair of shaped rim halves 29 and 30 welded together and to a hub disc 31 which is removably positioned on a flanged stud 32 welded or otherwise secured on the lever 25 or its extension arm 25a. The shaped rim halves 29 and 30 are not identical in cross section with the rim of a motor vehicle wheel but approximate its shape, being slightly modified in order to facilitate both the mounting and removal of the tires thereon and therefrom. The rims 27 and 28 are so shaped, however, that when a pneumatic tire is positioned thereon it will make a tight air seal at each bead portion of the tire and the high air pressure built up within the tire will not leak around the rim. The two rims 27 and 28 are shown without tires in Fig. 1 and with tires mounted thereon in Fig. 2, the tires being indicated by the reference numbers 33 and 34 in Fig. 2 and also being shown in Figs. 3 and 4.

The lever 25 is connected by a link 35 pivoted in a yoke 36 to the lever 25 and to a crank pin 37 carried by the bull gear 19. The link 35 is of such length and so attached to the lever 25 and bull gear 19 that during the "mold-closed" position (Fig. 2) the lever 25 is swung rearwardly and into position next to the molding machine, thus removing it and the tires 33 and 34 on the rims 27 and 28 from a position obstructing the aisle at the front of the machine along which operators and carrying mechanism move during the period consumed by a tire molding cycle. At the conclusion of a tire molding cycle, i.e., when the molding machine opens its molds to permit the removal of freshly molded tires, the linkage comprising the link 35 and lever 25 is swung outwardly to the position of Fig. 1 to facilitate access to the apparatus for the removal of previously post-curing inflated tires and the mounting of the two newly molded tires.

An air valve, generally indicated at 38, is mounted upon the side of the molding machine and controls the flow of air under pressure through air lines 39 to the interiors of the tires 33 and 34 mounted upon the apparatus of the invention. The air valve 38 is opened by an actuator 40, in this instance mounted on and carried by the bull gear 19, and swung around into valve actuating position after the molding machine is closed and the apparatus of the invention is moved into the position illustrated in Fig. 2. The air lines 39 are connected to a source of air under pressure substantially greater than the normal road pressure of the tires being molded. As earlier explained, this results in inflating the tires 33 and 34 to an extent much greater than that normally done in road service so as to stretch the nylon cord to the ultimate extent. The air pressure remains on the tire throughout the next tire molding cycle during which time the inflated tire cools to room temperature and sets in its stretched condition.

At the conclusion of the next molding cycle, after the molding machine moves from the position of Fig. 2 to the position of Fig. 1, the air is vented from the tire and the apparatus of the invention is swung forwardly. The operator removes the post-curing inflated tires from the rims 27 and 28. These tires are then sent to suitable finishing and shipping departments of the factory.

During the post-curing inflation treatment, nylon cord tires may "grow" a full tire size and will remain at the larger size. For this reason, tires of this type may be marked with a size approximately one size larger than that at which they are initially molded and in service are used at this larger size which they achieve during the post-curing inflation and which they retain during their service life. By thus inflating the tires under excessive pressure, they are enlarged to the size which they would otherwise not reach until after they entered service and they are cooled at that larger size. As a result, the otherwise prevalent fault of tread groove cracking is greatly reduced by the post-curing inflation step.

The apparatus illustrated in Figs. 5 and 6 is an embodiment of the invention designed for attachment to another type of conventional tire molding machine. In common with the tire molding machine illustrated in Figs. 1–3, the tire molding machine shown in Figs. 5 and 6 comprises one or two tire molds each of which includes a mold top 50 and mold bottom 51. The mold tops 50 are mounted upon suitable bridging mechanism (not shown) and connected by heavy links 52 to a pair of walking arms 53 oscillated between the positions of Figs. 5 and 6 by a pair of crank arms 54 connected to cranks 55 mounted on oscillatory bull gears 56. In common with the molding machine of Figs. 1–3, the mold machine shown in Figs. 5 and 6 usually also has tire lifters 57 which act to lift a molded tire 58 out of the bottom tire mold at the completion of a molding cycle.

Apparatus embodying the invention as designed for attachment to a tire molding machine of the type shown in Figs. 5 and 6 comprises a lever 59 pivotally mounted by ears 60 attached to the main frame of the tire molding machine. The lever 59 may have an extension 59a and mounts at its free end one or two tire rims 60 and 61. The lever 59 is connected by articulated linkage, generally indicated at 62, to an arm 63 which is attached to the heavy walking arm 53 of the tire molding machine rather than directly to its actuating bull gear 56 as is the case in the embodiment of Figs. 1–3. The articulated linkage 62 is so designed that during "mold-open" position, as shown in Fig. 5, the apparatus of the invention is swung forwardly for access by the molding machine operator. Similarly, during "mold-closed" position, as shown in Fig. 6, the apparatus embodying the invention is swung rearwardly into the space adjacent the molding machine where it does not obstruct access to the machine or traffic in the plant. A pair of tires 64 and 65 are shown in position in Fig. 6 undergoing post-curing inflation during the molding of a subsequent pair of tires in the molding machine.

An air valve 66 is mounted on the side of the molding machine in position to be actuated by engagement of the walking arm member of the mold top mechanism during the "mold-closed" part of the cycle for admitting air through air lines 67 under pressure greater than normal road pressure into the two tires 64 and 65 during their post-curing inflation and for venting the air from the tires at the conclusion of the cycle.

We claim:

1. Apparatus for post-curing inflation of pneumatic tires, said apparatus constituting an attachment for a conventional tire molding machine having mold opening and closing mechanism, said apparatus comprising, in combination, a lever pivotally mounted at one side of said molding machine for oscillatory movement in a vertical plane, at least one tire rim mounted at a free end of said lever, linkage connecting said lever to said mold mechanism constructed and arranged to swing said lever to a position in front of said molding machine at "mold-open" position and to a position beside said molding machine at "mold-closed" postion, a source of air under pressure substantially greater than the normal road pressure of tires molded on said molding machine, an air line to said rim for feeding air into the interior of a tire mounted thereon, an air valve for said line, and an air valve actuator carried by an element of said mold mechanism for feeding such air under pressure to a tire on said rim at the initiation of a mold-closed part of a molding cycle and for venting air therefrom at the beginning of a mold-open part of a molding cycle.

2. Apparatus according to claim 1 for a molding machine having mold mechanism comprising a bull gear and a walking arm, in which the linkage is connected between the apparatus lever and the molding machine walking arm.

3. Apparatus according to claim 1 for a molding machine having mold mechanism comprising a bull gear and a walking arm, in which the linkage is connected between the apparatus lever and the molding machine bull gear.

References Cited in the file of this patent

UNITED STATES PATENTS

| | | |
|---|---|---|
| 1,888,429 | Matson | Nov. 22, 1932 |
| 2,290,627 | Stevens | July 21, 1942 |